US012725021B2

(12) United States Patent
Reynolds et al.

(10) Patent No.: US 12,725,021 B2
(45) Date of Patent: Sep. 1, 2026

(54) DATA PROCESSING

(71) Applicant: Arm Limited, Cambridge (GB)

(72) Inventors: Charles Edward Michael Reynolds, Cherry Hinton (GB); Emre Özer, Cherry Hinton (GB)

(73) Assignee: Arm Limited, Cambridge (GB)

( * ) Notice: Subject to any disclaimer, the term of this patent is extended or adjusted under 35 U.S.C. 154(b) by 1119 days.

(21) Appl. No.: 17/753,286

(22) PCT Filed: Aug. 24, 2020

(86) PCT No.: PCT/GB2020/052034
§ 371 (c)(1),
(2) Date: Feb. 25, 2022

(87) PCT Pub. No.: WO2021/038216
PCT Pub. Date: Mar. 4, 2021

(65) Prior Publication Data
US 2022/0318611 A1 Oct. 6, 2022

(30) Foreign Application Priority Data
Aug. 30, 2019 (GB) ..................................... 1912523

(51) Int. Cl.
*G06N 3/063* (2023.01)
*G06N 3/082* (2023.01)

(52) U.S. Cl.
CPC ............ *G06N 3/063* (2013.01); *G06N 3/082* (2013.01)

(58) Field of Classification Search
CPC ............................... G06N 3/063; G06N 3/082
See application file for complete search history.

(56) References Cited

U.S. PATENT DOCUMENTS

2020/0065676 A1* 2/2020 Lo .......................... G06N 20/00

FOREIGN PATENT DOCUMENTS

CN 106611216 A 5/2017
WO 2019/0155910 A1 8/2019
WO 2021/0038216 A1 3/2021

OTHER PUBLICATIONS

Courbariaux, et. al., "Binarized Neural Networks: Training Deep Neural Networks with Weights and Activations Constrained to +1 or -1", arXiv: 1602.02830v3 [cs.LG] Mar. 17, 2016 (Year: 2016).*

(Continued)

*Primary Examiner* — Viker A Lamardo
*Assistant Examiner* — Sally T. Ley
(74) *Attorney, Agent, or Firm* — NIXON & VANDERHYE P.C.

(57) ABSTRACT

Data processing apparatus having a binary neural network, BNN, circuitry to implement a BNN; the BNN circuitry having at least one instance of hidden layer circuitry responsive to trained one-bit weight values and input data values to generate a hidden layer output signal; each input data value has a one-hot n-bit data value, where n is an integer greater than one; the hidden layer circuitry is configured to generate the hidden layer output signal dependent upon an intermediate result of a selective inversion operation applied to each bit of a given input data value; the hidden layer circuitry has circuitry to generate a respective intermediate result as a first predetermined result value for the given input data value; and, for a group of trained one-bit weight values, circuitry to generate a respective intermediate result as a second predetermined result value for the given input data value.

19 Claims, 10 Drawing Sheets

(56) References Cited

OTHER PUBLICATIONS

Andri, et al., "YodaNN: An Architecture for Ultra-Low Power Binary-Weight CNN Acceleration", arXiv:1606.05487v4 [cs.AR] Feb. 24, 2017 (Year: 2017).*
S. Yin et al., "A 141 UW, 2.46 PJ/Neuron Binarized Convolutional Neural Network Based Self-Learning Speech Recognition Processor in 28NM CMOS," 2018 IEEE Symposium on VLSI Circuits, Honolulu, HI, USA, 2018, pp. 139-140, doi: 10.1109/VLSIC.2018.8502309 (Year: 2018).*
H. Kim, J. Sim, Y. Choi and L.-S. Kim, "NAND-Net: Minimizing Computational Complexity of In-Memory Processing for Binary Neural Networks," 2019 IEEE International Symposium on High Performance Computer Architecture (HPCA), Washington, DC, USA, 2019, pp. 661-673, doi: 10.1109/HPCA.2019.00017; (Year: 2019).*
Amartya Sanyal et al: "TAPAS: Tricks to Accelerate (encrypted) Prediction As a Service", arxiv.org, Cornell University Library, 201 Olin Library Cornell University Ithaca, NY 14853, Jun. 9, 2018 (Jun. 9, 2018), XP080888858, sections 3.2, 5.2, 5.3.
Matthieu Courbariaux et al: Binarized Neural Networks: Training Neural Networks with Weights and Activations Constrained to +1 or −111 , arXiv.org, Mar. 17, 2016 (Mar. 17, 2016), pp. 1-11, XP055405835, Retrieved from the Internet: URL:https://arxiv.org/pdf/1602.02830.pdf [retrieved on Mar. 20, 2018] section 1.
Mohammad Rastegari et al: "XNOR-Net: ImageNet Classification Using Binary Convolutional Neural Networks" 1In: 1 12th European Conference on Computer Vision, ECCV 2012, Aug. 2, 2016 (Aug. 2, 2016), Springer Berlin Heidelberg, Berlin Germany 031559, XP055678493, ISSN: 0302-9743 ISBN: 978-3-642-04427-4 vol. 9908, pp. 525-542, DOI: 10.1007/978-3-319-46493-0-32, section 3.
Accelerating Binarized Neural Networks: Comparison of FPGA, CPU, GPU, and ASIC Eriko Nurvitadhi, David Sheffield, Jaewoong Sim, Asit Mishra, Ganesh Venkatesh and Debbie Marr Accelerator Architecture Lab, Intel Corporation.
The Concrete Distribution: a Continuous Relaxation of Discrete Random Variables Chris J. Maddison1,2, Andriy Mnih1, & Yee Whye Teh1 1DeepMind, London, United Kingdom2University of Oxford, Oxford, United Kingdom cmaddis@stats.ox.ac.uk.
Softmax function.

* cited by examiner

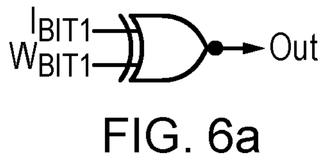
FIG. 6a
$$Out = \{I_{BIT0} \text{ if } W_{BIT0} = 1, \text{ Not } I_{BIT0} \text{ if } W_{BIT0} = 0\}$$
FIG. 6b
| $W_0$ | $I_0$ | XNOR |
|---|---|---|
| 0 | 0 | 1 (i.e. Not $I_0$) |
| 0 | 1 | 0 (i.e. Not $I_0$) |
| 1 | 0 | 0 (i.e. $I_0$) |
| 1 | 1 | 1 (i.e. $I_0$) |
FIG. 6c
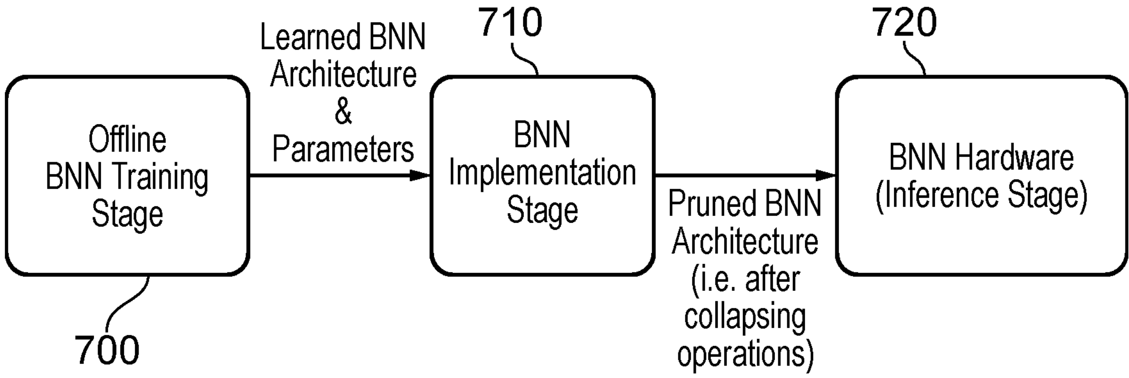
FIG. 7

DATA PROCESSING

BACKGROUND

This disclosure relates to data processing apparatus and methods.

Data processing techniques using so-called artificial neural networks (ANNs) have been proposed. A particular example of an ANN is a so-called binary or binarized neural network (BNN) in which at least weight values and the outputs of activation functions are represented at run (inference) time by binary (one bit) values. It has been found empirically that the performance of a BNN can tend towards that of an ANN using full precision (which is to say, at least multi-bit) trained weights and activations.

In order to make use of the operations of a BNN, input data generally needs to be encoded into a representation suitable for processing by one-bit weights. The encoding process is important for the operation of a BNN, particularly if the encoding is lossy (for example, involving a form of quantisation). On one hand, a poor encoding can cause sub-optimal predictive accuracy by destroying or harming critical information or features in attributes of the input data. On the other hand, a rich encoding, for example preserving full precision floating point or fixed-point features, can be prohibitively expensive to work with on hardware. That is to say that if the technique is embodied in a bespoke physical circuit or a programmable circuit such as an application specific integrated circuit (ASIC) or a field programmable gate array (FPGA), an excessive number of gates is required for a practical implementation.

SUMMARY

In an example arrangement there is provided data processing apparatus comprising:

binary neural network, BNN, circuitry to implement a BNN;

the BNN circuitry comprising at least one instance of hidden layer circuitry responsive to trained one-bit weight values and input data values to generate a hidden layer output signal;

in which:

each input data value comprises a one-hot n-bit data value, where n is an integer greater than one, in which, for any input data value, only one bit of the given input data value has a first predetermined bit value and all other bits of that input data value have a second predetermined bit value complementary to the first predetermined bit value, the trained one-bit weight values comprise groups of n trained one-bit weight values, each group being associated with a respective input data value;

the hidden layer circuitry is configured to generate the hidden layer output signal dependent upon an intermediate result of a selective inversion operation applied to each bit of a given input data value, the selective inversion operation being defined, as one of an inversion operation and a non-inversion operation, by a bit value of a respective one of the trained one-bit weight values of the group of trained one-bit weight values associated with the given input data value;

the hidden layer circuitry comprises, for a group of trained one-bit weight values which all define a non-inversion operation, circuitry to generate a respective intermediate result as a first predetermined result value for the given input data value which is independent of the given input data value; and, for a group of trained one-bit weight values which all define an inversion operation, circuitry to generate a respective intermediate result as a second predetermined result value for the given input data value which is independent of the given input data value.

In another example arrangement there is provided data processing apparatus comprising:

binary neural network, BNN, circuitry to implement a BNN;

the BNN circuitry comprising at least one instance of hidden layer circuitry responsive to trained one-bit weight values and input data values to generate a hidden layer output signal;

in which:

each input data value comprises a one-hot n-bit data value, where n is an integer greater than one, in which, for any input data value, only one bit of the given input data value has a first predetermined bit value and all other bits of that input data value have a second predetermined bit value complementary to the first predetermined bit value, the trained one-bit weight values comprise groups of n trained one-bit weight values, each group being associated with a respective input data value;

the hidden layer output signal is dependent upon an intermediate result of a selective inversion operation applied to each bit of a given input data value, the selective inversion operation being defined, as one of an inversion operation and a non-inversion operation, by a bit value of a respective one of the trained one-bit weight values of the group of trained one-bit weight values associated with the given input data value, and a comparison of a sum of the intermediate results generated for all of the input data values with a threshold value;

the hidden layer circuitry comprises, when the threshold value is greater than a maximum possible value of the sum of intermediate results, circuitry to generate a first value of the hidden layer output signal independently of the trained one-bit weight values and the input data values; and when the threshold value is less than or equal to a minimum possible value of the sum of intermediate results, circuitry to generate a second value of the hidden layer output signal independently of the trained one-bit weight values and the input data values.

In another example arrangement there is provided a computer-implemented method comprising:

generating binary neural network, BNN, circuitry to implement a BNN;

the BNN comprising at least one instance of a hidden layer responsive to trained one-bit weight values and input data values to generate a hidden layer output signal;

in which:

each input data value comprises a one-hot n-bit data value, where n is an integer greater than one, in which, for any input data value, only one bit of the given input data value has a first predetermined bit value and all other bits of that input data value have a second predetermined bit value complementary to the first predetermined bit value, the trained one-bit weight values comprise groups of n trained one-bit weight values, each group being associated with a respective input data value;

the hidden layer is configured to generate the hidden layer output signal dependent upon an intermediate result of a selective inversion operation applied to each bit of a given input data value, the selective inversion operation being defined, as one of an inversion operation and a non-inversion operation, by a bit value of a respective one of the trained one-bit weight values of the group of trained one-bit weight values associated with the given input data value;

the method comprising:

for a group of trained one-bit weight values which all define a non-inversion operation, generating BNN circuitry which uses a respective intermediate result as a first predetermined result value for the given input data value which is independent of the given input data value; and, for a group of trained one-bit weight values which all define an inversion operation, generating BNN circuitry which uses a respective intermediate result as a second predetermined result value for the given input data value which is independent of the given input data value.

In another example arrangement there is provided a computer-implemented method comprising:

training a binary neural network, BNN, the BNN being configured to apply a processing function defined by a set of one or more learned parameters to generate output data values in response to input data values, the BNN comprising an encoding layer to encode each input data value into a respective one-hot n-bit data value in which each of the n bits indicates whether the input data value lies in a respective sub-range defined by respective learned range boundaries, the training step comprising training at least the learned parameters and the learned range boundaries.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIGS. 6*a* to 6*c* schematically illustrate aspects of an XNOR operation;

FIG. 7 is a schematic diagram illustrating an overview of a technique;

DESCRIPTION OF EMBODIMENTS

Figures 1, 2:
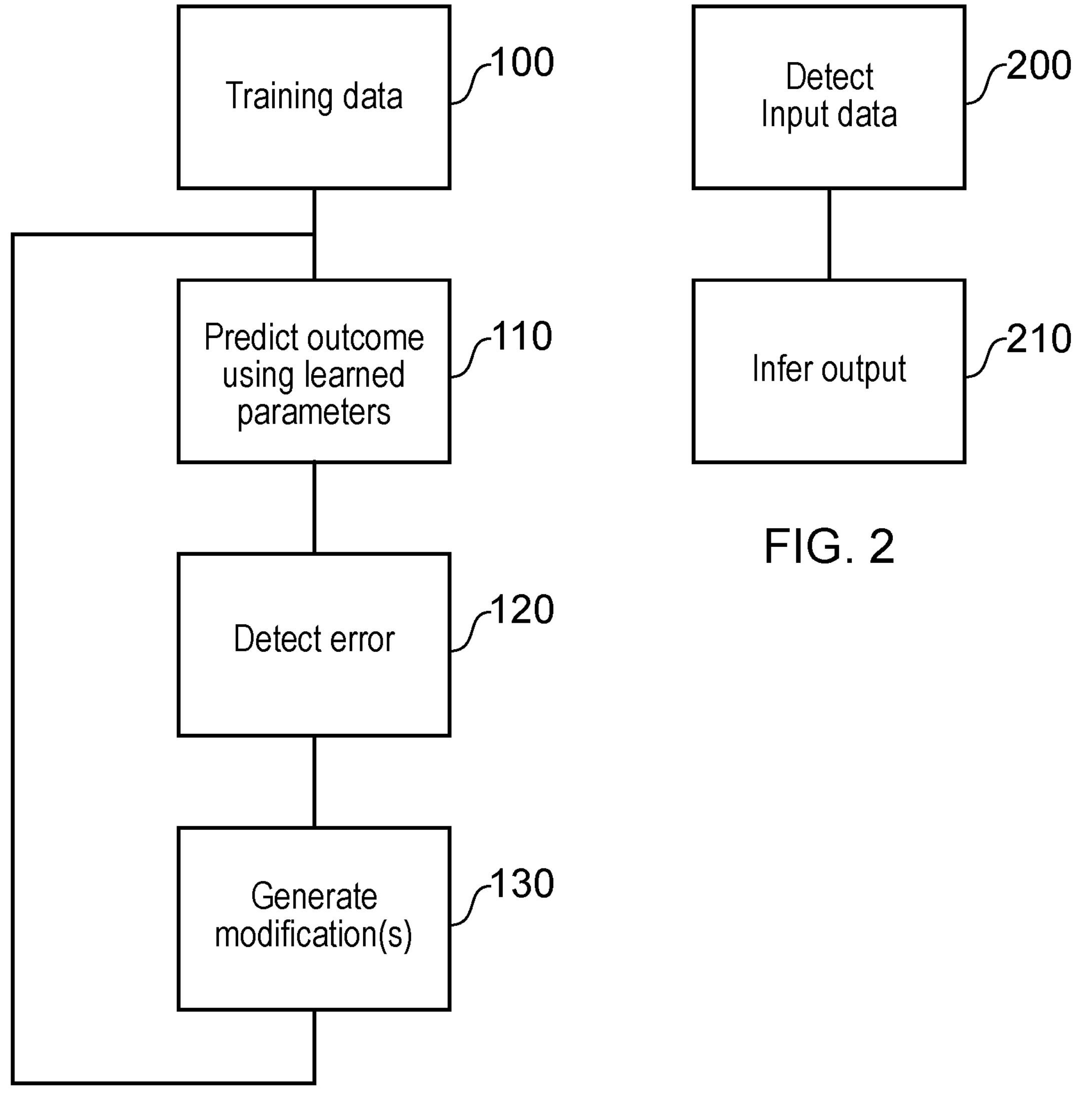
FIG. 1 schematically illustrates a training phase for an artificial neural network (ANN)
FIG. 2 schematically illustrates an inference phase for an ANN.

Before discussing the embodiments with reference to the accompanying figures, the following description of embodiments is provided.

An example embodiment provides data processing apparatus comprising:

binary neural network, BNN, circuitry to implement a BNN;

the BNN circuitry comprising at least one instance of hidden layer circuitry responsive to trained one-bit weight values and input data values to generate a hidden layer output signal;

in which:

each input data value comprises a one-hot n-bit data value, where n is an integer greater than one, in which, for any input data value, only one bit of the given input data value has a first predetermined bit value and all other bits of that input data value have a second predetermined bit value complementary to the first predetermined bit value, the trained one-bit weight values comprise groups of n trained one-bit weight values, each group being associated with a respective input data value;

the hidden layer circuitry is configured to generate the hidden layer output signal dependent upon an intermediate result of a selective inversion operation applied to each bit of a given input data value, the selective inversion operation being defined, as one of an inversion operation and a non-inversion operation, by a bit value of a respective one of the trained one-bit weight values of the group of trained one-bit weight values associated with the given input data value;

the hidden layer circuitry comprises, for a group of trained one-bit weight values which all define a non-inversion operation, circuitry to generate a respective intermediate result as a first predetermined result value for the given input data value which is independent of the given input data value; and, for a group of trained one-bit weight values which all define an inversion operation, circuitry to generate a respective intermediate result as a second predetermined result value for the given input data value which is independent of the given input data value.

Embodiments of the present disclosure can provide data processing apparatus implementing a BNN which potentially uses fewer processing elements such as gates, by recognising that processing associated with groups of trained one-bit weight values (for example, weight values which do not change in an inference phase) in a one-hot encoding system can potentially be reduced to much simpler circuitry given that their outcome will be independent of the actual encoded feature value.

In examples of the one-hot arrangement, the first predetermined bit value is 1 and the second predetermined bit value is 0.

A combination such as an XNOR combination may be used, so that each trained one-bit weight value defines an inversion operation by that trained one-bit weight value being 0, and a non-inversion operation by that trained one-bit weight value being 1. Alternative combinations such as XOR are also applicable.

In examples, the first predetermined result value is equal to the sum of the first predetermined bit value plus $(n-1)\times$the second predetermined bit value; and the second predetermined result value is equal to the sum of the second predetermined bit value plus (n−1)×the first predetermined bit value.

In examples, the hidden layer circuitry comprises activation function circuitry to generate the hidden layer output signal as a one-bit signal dependent upon a comparison of a sum of the intermediate results generated for all of the input data values with a threshold value.

Another example embodiment provides data processing apparatus comprising:

binary neural network, BNN, circuitry to implement a BNN;

the BNN circuitry comprising at least one instance of hidden layer circuitry responsive to trained one-bit weight values and input data values to generate a hidden layer output signal;

in which:

each input data value comprises a one-hot n-bit data value, where n is an integer greater than one, in which, for any input data value, only one bit of the given input data value has a first predetermined bit value and all other bits of that input data value have a second predetermined bit value complementary to the first predetermined bit value, the trained one-bit weight values comprise groups of n trained one-bit weight values, each group being associated with a respective input data value;

the hidden layer output signal is dependent upon an intermediate result of a selective inversion operation applied to each bit of a given input data value, the selective inversion operation being defined, as one of an inversion operation and a non-inversion operation, by a bit value of a respective one of the trained one-bit weight values of the group of trained one-bit weight values associated with the given input data value, and a comparison of a sum of the intermediate results generated for all of the input data values with a threshold value;

the hidden layer circuitry comprises, when the threshold value is greater than a maximum possible value of the sum of intermediate results, circuitry to generate a first value of the hidden layer output signal independently of the trained one-bit weight values and the input data values; and when the threshold value is less than or equal to a minimum possible value of the sum of intermediate results, circuitry to generate a second value of the hidden layer output signal independently of the trained one-bit weight values and the input data values.

Another example embodiment provides a computer-implemented method comprising:

generating binary neural network, BNN, circuitry to implement a BNN;

the BNN comprising at least one instance of a hidden layer responsive to trained one-bit weight values and input data values to generate a hidden layer output signal;

in which:

each input data value comprises a one-hot n-bit data value, where n is an integer greater than one, in which, for any input data value, only one bit of the given input data value has a first predetermined bit value and all other bits of that input data value have a second predetermined bit value complementary to the first predetermined bit value, the trained one-bit weight values comprise groups of n trained one-bit weight values, each group being associated with a respective input data value;

the hidden layer is configured to generate the hidden layer output signal dependent upon an intermediate result of a selective inversion operation applied to each bit of a given input data value, the selective inversion operation being defined, as one of an inversion operation and a non-inversion operation, by a bit value of a respective one of the trained one-bit weight values of the group of trained one-bit weight values associated with the given input data value;

the method comprising:

for a group of trained one-bit weight values which all define a non-inversion operation, generating BNN circuitry which uses a respective intermediate result as a first predetermined result value for the given input data value which is independent of the given input data value; and, for a group of trained one-bit weight values which all define an inversion operation, generating BNN circuitry which uses a respective intermediate result as a second predetermined result value for the given input data value which is independent of the given input data value.

In examples, when the threshold value is greater than a maximum possible value of the sum of intermediate results, the method comprises generating circuitry which uses a first value of the hidden layer output signal independently of the trained one-bit weight values and the input data values; and when the threshold value is less than or equal to a minimum possible value of the sum of intermediate results, the method comprises generating circuitry which uses a second value of the hidden layer output signal independently of the trained one-bit weight values and the input data values.

Another example embodiment provides circuitry generated by the method defined above.

Another example embodiment provides computer software which, when executed by a computer, causes the computer to perform the method defined above.

Another example embodiment provides a non-transitory, machine-readable medium which stores computer software as defined above.

Another example embodiment provides a computer-implemented method comprising: training a binary neural network, BNN, the BNN being configured to apply a processing function defined by a set of one or more learned parameters to generate output data values in response to input data values, the BNN comprising an encoding layer to encode each input data value into a respective one-hot n-bit data value in which each of the n bits indicates whether the input data value lies in a respective sub-range defined by respective learned range boundaries, the training step comprising training at least the learned parameters and the learned range boundaries.

This can provide a potentially more efficient BNN by allowing not only the weights and other parameters to be learned, but also the range or bin boundaries in a one-hot encoded system.

The training step may comprise, for each of a plurality of instances of input data values in a set of training data during an iterative training phase of the BNN:

deriving the one-hot n-bit data value using a current set of the range boundaries;

applying the processing function in dependence upon a current set of the learned parameters to generate a test output data value;

comparing the test output data value with a corresponding output data value of the training data; and generating one or modifications to the learned range boundaries and the learned parameters in response to the comparing step.

The deriving step may comprise the encoding layer allocating respective sub-ranges of possible values of the input data value to each bit position in the one-hot n-bit data values.

In example arrangements, for a given input data value, generating a set of n test values each representing a respective probability that the input data value falls into a respective test sub-range defined by one or more learned range boundaries;

adding a set of n offset values to respective ones of the test values;

generating the input data value by assigning a first predetermined bit value to a bit position in dependence upon sum of the test values and the offset values;

processing the input data value using the BNN;

deriving an error value; and updating the one or more learned range boundaries in dependence upon a gradient of an error value with respect to the one or more learned range boundaries.

In example arrangements the one or more learned range boundaries include a multiplicative parameter m and an additive parameter b for each respective bit position. The method may comprise multiplying the sample data value by m and adding b to the product of the sample data value and m.

The test values may be generated by applying a softmax function.

The method may comprise deriving a set of sub-ranges for use in an inference phase in dependence upon the one or more learned parameters.

Another example embodiment provides a BNN trained by the method defined above.

Another example embodiment provides circuitry implementing the BNN defined above.

Another example embodiment provides computer software which, when executed by a computer, causes the computer to perform the method defined above.

Another example embodiment provides a non-transitory, machine-readable medium which stores computer software as defined above.

Referring now to the drawings, example implementations of artificial neural networks (ANNs) will be described. Note that so-called binary neural networks (BNNs) which will be described below, represent particular examples of ANNs.

An ANN serves to apply a learned process to input data in order to generate output data. The input data may be, for example, captured real world data such as image data, temperature measurements, blood test results or the like. The output data can be, for example, a categorization of the input data (such as "does the image data represent a cat?"; "has the temperature varied to such an extent that an item of food is no longer safe to eat?"; "is the patient about to develop a certain dangerous medical condition?" or the like). It will be appreciated that these are merely examples and a wide range of uses are envisaged for ANNs.

An ANN performs its processing in a so-called inference phase by applying learned parameters (such as so-called weights) to input data items. In order to learn the appropriate values of the learned parameters, a so-called training phase is conducted first.

Referring to FIG. 1, a training phase for an ANN is illustrated. The training process is performed with respect to so-called training data 100. This can include instances of data pairs of (actual input data, ground truth output data) which can be detected individually from real observations or which can be generated artificially, for example by manipulating one or more base pairs of training data and ground truth output data.

The training data may comprise a significant number (perhaps, many thousands) of data acquisitions (or artificially generated instances of input, output data), some indicating each of the available categorisations of the input data.

During the training phase, an outcome (as an instance of output data) is predicted at a step 110 using machine learning parameters such as learned weights. At a step 120, an error function between the outcomes associated with the ground truth output and the predicted outcomes at the step 110 is detected, and at a step 130, modification(s) to the parameters such as the learned weights are generated and applied for the next iteration of the steps 110, 120, 130.

Each iteration can be carried out using different instances of the training data 100, for example. Or sets of training data can be reapplied multiple times in successive iterations.

The training process can be continued until the learned parameters converge to particular values, or until a particular number of iterations has been performed. The result of the training phase is a set of learned parameters which can then be applied in an inference phase.

Generally speaking, the learned parameters are no longer altered during the inference phase; they are simply applied to real input data.

In an inference phase of the trained machine-learning processor (FIG. 2), input data of a similar nature to that of the training data, but not necessarily having a predetermined "correct" output associated with it is detected at a step 200, and then, at a step 210, an output is inferred using a similar process to that of the step 110 but using the trained machine learning parameters generated as described above.

(Note that the accuracy of the trained ANN can in fact be tested by using input data with an associated ground truth output, and then comparing the output which is inferred at the step 210 with the known ground truth output. In other modes of operation, however, such as in an actual use situation, there may be no ground truth output available, and so the ANN is used to infer an output based on a set of input data).

Example BNN

Figure 3:
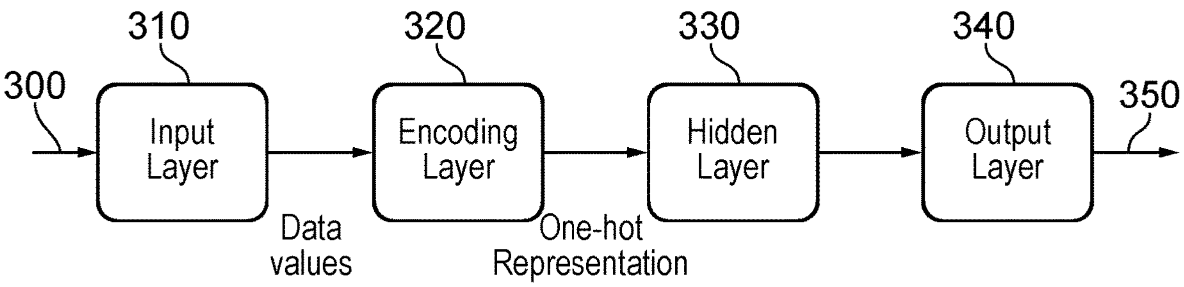
FIG. 3 is a schematic diagram providing an overview of a binary neural network (BNN)

FIG. 3 is a schematic diagram providing an overview of a binary neural network (BNN);

The input data representation to many modern ANNs use quantised values. In some examples, the values may be quantised to the range of 2-8 bits rather than floating-point representations in order to reduce hardware overheads when implemented as hardware accelerators. In an extreme case, so-called binary neural networks (BNNs) use binary (one bit) inputs and weights in both train and inference stages.

Referring to FIG. 3, input data values 300 are processed by an input layer 310 to generate data values. These data values are then processed by an encoding layer 320 to generate a so-called one-hot representation of the data values. In a one-hot n-bit data value, where n is an integer greater than 1, only one bit of the one-hot data value has a first predetermined bit value and all other bits of the one-hot data value have a second predetermined bit value complimentary to the first predetermined bit value.

For example, the first predetermined bit value may be 1 and the second predetermined bit value may be 0. In such a one-hot data value, there will be only a single instance of a 1, with the other bits of the one-hot data value being 0.

Of course, it is possible for the one-hot data value to use 0 as the "hot" first predetermined bit value, in which case such a one-hot data value would have a single instance of a 0 with the remaining bits being 1. For clarity of the present description, the examples will refer to the first predetermined bit value (the "hot" value) being 1.

Examples of one-hot five-bit data values are 00001; 00010; 00100; 01000 and 10000. As discussed below, the choice of which bit is "hot" (the first predetermined value) can depend upon whether a corresponding data value lay in a particular range associated with that bit position.

The one-hot data values are processed as individual bits in the BNN arrangement by a so-called hidden layer 330, with the results from the hidden layer being processed by an output layer 340 to generate an output data item 350. The hidden layer and the output layer will be discussed in more detail below.

One-Hot Encoding

The encoding into the one-hot representation may be carried out by a set of comparators 400 (FIG. 4), each of which is responsive to data refining a set of range boundaries 410. In at least example arrangements, the range boundaries are arranged so as to be non-overlapping, so that there is an unambiguous range applicable to any instance of an input data value 420.

In operation, each of the comparators 400 compares the input data value 420 with a respective range and generates a respective output bit 430 indicative of whether the input data value lies within (output bit 1) or outside (output bit=0) the respective range. The set of output bits 430 forms the one-hot data value in which, because the input value lies within only one of the ranges, only one bit is a 1 and the rest are 0.

Note that in at least example embodiments, the set of ranges defined by the range boundaries 410 are contiguous so that any possible input data value 420 will lie within one, and only one, of the ranges.

Figure 4:
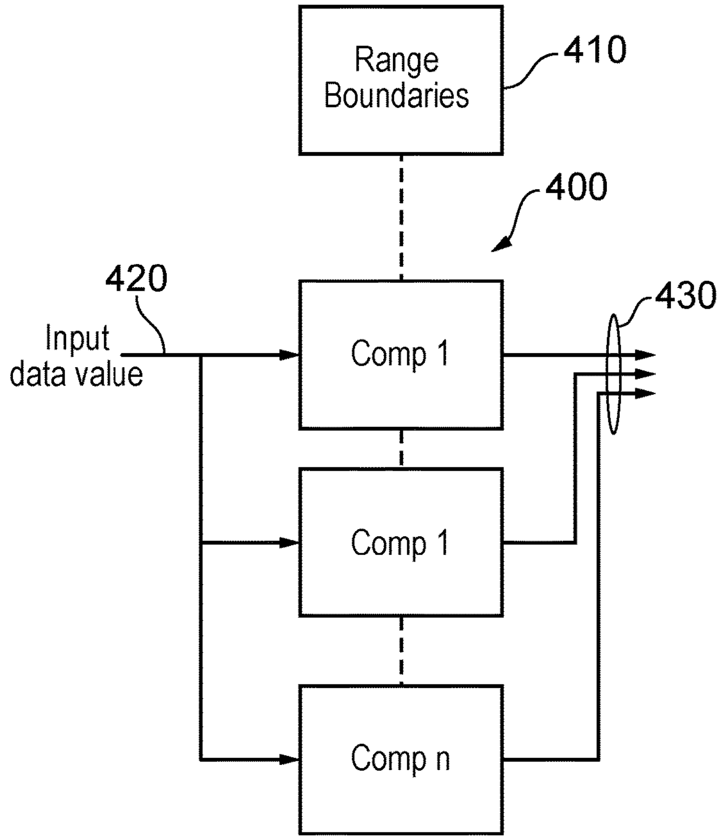
FIG. 4 schematically illustrates operations of an encoding layer.

Referring to the five-bit example mentioned above, the operation of the set of comparators 400 may be summarised as follows:

| Data value, x | Output of apparatus of FIG. 4 |
|---|---|
| R0 < x <= R1 | 00001 |
| R1 < x <= R2 | 00010 |
| R2 < x <= R3 | 00100 |
| R3 < x <= R4 | 01000 |
| R4 < x <= R5 | 10000 |

where R0 . . . R5 are data indicative of range boundaries, and (in this example) there is a monotonic increase from R0 to R5. Note that the lowest boundary R0 and the highest boundary R5 may be implied or not needed depending on the nature of the data in use, in that the first and last tests as shown in the table may be replaced by:

x<=R1 and

R4<x respectively.

Respective one-hot data values may be generated in respect of input data values representing a set of so-called "features", each feature relating to a detected measurement or parameter within the input data. These are then processed by the hidden layer 330.

Figure 5:
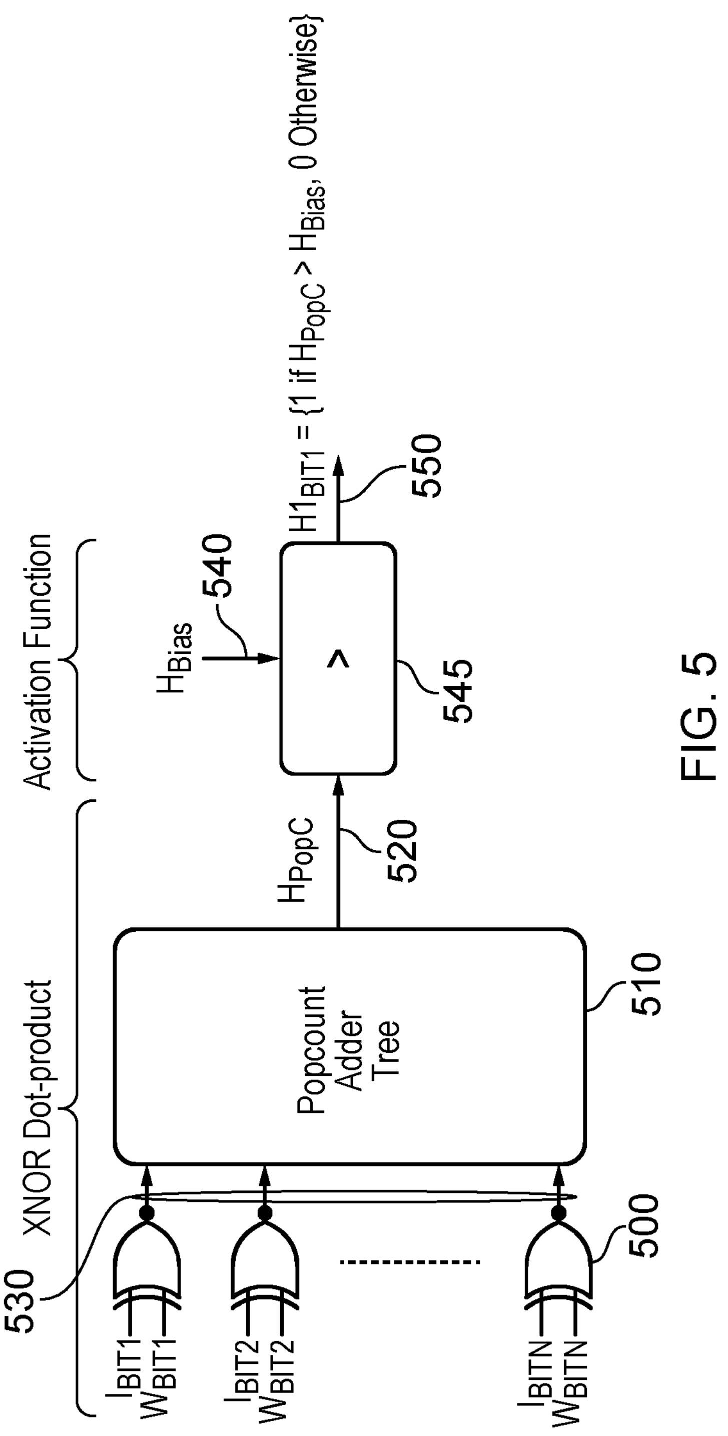
FIG. 5 schematically illustrates operations of a hidden layer.

Further information about an example hidden layer will now be provided with reference to FIG. 5.

Hidden Layer

In an example BNN, the hidden layer represents a multiplication of each data value by a respective learned weight. In the realm of 1-bit binary representations such as the one-hot representations discussed above, the multiplication process is implemented as a so-called dot product between individual bits of the one-hot data values and respective weight bits. In terms of binary logic, the dot product may be implemented by a so-called exclusive NOR function (XNOR). Here, each individual bit $I_{BITN}$ is subject to an XNOR combination with a respective weight bit $W_{BITN}$. In FIG. 5, a set of XNOR gates 500 is shown for the N bits of an example one-hot data value. Each XNOR gate generates an output:

$I_{BITN}$ XNOR $W_{BITN}$

A population count ("popcount") adder tree 510 produces an output 520 which in this example is a multi-bit value indicative of the number of XNOR outputs 530 having a value of 1. This output 520 is applied to an activation function stage 545 in which the output 520 is compared with a bias value 540 so as to generate a one-bit output 550 which is, in this example, 1 if the value 520 is greater than the threshold 540, or 0 otherwise. In this way, the hidden layer circuitry as implemented comprises activation function circuitry to generate a hidden layer output signal as a one-bit signal dependent upon a comparison of a sum of the intermediate results generated for all of the input data values with a threshold value.

In an example using representations of multiple input features, a set 500 of XNOR gates is provided for each of the multiple features and the popcount adder tree 510 may produce the output 520 in dependence upon the total number of 1s amongst the outputs 530 for all of the features taken together. So, for example, if a five-bit one-hot representation is generated for each input feature by the encoding layer, and (say) ten features are taken into account, then ten sets of five XNOR gates 500 are provided, each being associated with a respective learned weight, and the popcount adder tree 510 is in principle capable of outputting between 0 and 50 as the output 520.

XNOR Operations

FIGS. 6*a* to 6*c* schematically illustrates an XNOR operation. In the present examples, note that the weight values are fixed, at least by the time that the inference phase is performed. This means that as shown in FIG. 6*b* and FIG. 6*c*, the XNOR function is functionally equivalent to a selective inversion. In particular, an input bit $I_{BIT}$ is passed if the corresponding weight bit $W_{BIT}$ is 1, but the input bit $I_{BIT}$ is inverted if the corresponding weight bit is 0. In other words, for a weight bit $W_{BIT}$ of 0, the XNOR output is NOT $I_{BIT}$, whereas for a weight bit $W_{BIT}$ of 1, the XNOR output is $I_{BIT}$.

Generation Methods

FIG. 7 is a schematic diagram illustrating an overview of a method applicable to example embodiments.

At a stage 700, a BNN is trained using, for example, the techniques set out in FIG. 1 above. This is referred to in FIG. 7 as an "offline" stage, the term offline being relative to the "online" inference operation of hardware to be described below.

The result of the BNN training stage 700 is a learned architecture and a set of learned parameters such as weights, activation function parameters and the like.

At a stage 710, a hardware design is generated for the BNN, so this is referred to in FIG. 7 as a "BNN implementation" stage. Again, this is an "offline" stage with respect to the use of the hardware in the inference stage.

One possible option at the stage 710 would be to implement every possible processing operation of the trained BNN by a respective system of logic gates, an arrangement referred to here as a "raw" implementation. However, in example embodiments to be discussed below, certain improvements relative to these arrangements, which may be referred to at least partial optimisations, are applied, so that a so-called "pruned" or reduced BNN architecture is generated and potentially uses fewer gates than the raw implementation referred to above. This can be implemented then as BNN hardware 720 for use at the inference stage.

Figure 8:
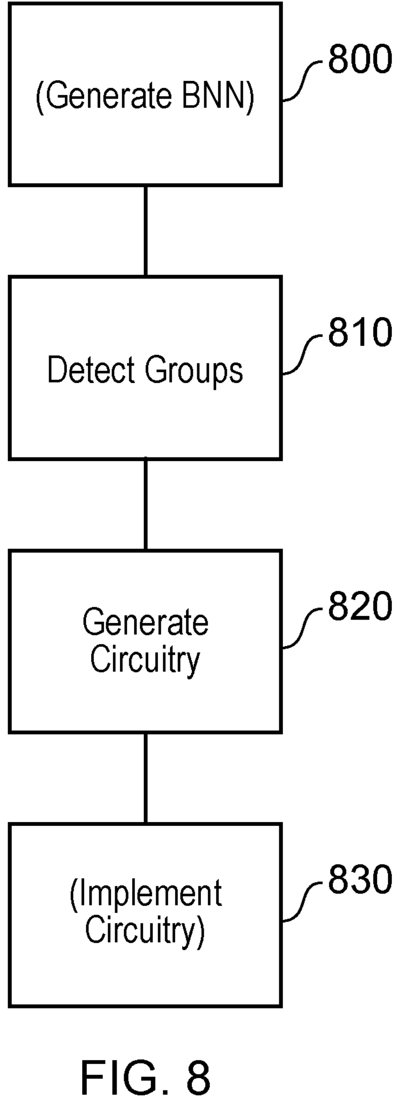
FIG. 8 is a schematic flowchart illustrating a method.

FIG. 8 is a schematic flowchart illustrating a computer-implemented method involving generating BNN circuitry to implement a BNN.

At a step 800, the BNN is generated, for example by the training process of FIG. 1 (and corresponding to the stage 700). This step is shown in parentheses because it is optional with respect to the implementation steps to be described below. In other words, the BNN might have been generated elsewhere but can still be implemented using the steps to be described below.

In example arrangements, the BNN comprises at least one instance of a hidden layer responsive to trained one-bit weight values and input data values to generate a hidden layer output signal. The input data values may be one-hot data values as discussed above. The trained one-bit weight values may comprise groups of n trained one-bit weight values, each group being associated with a respective input data value. The hidden layer may be configured to generate the hidden layer output signal dependant of an intermediate result of a selective inversion operation applied to each bit of a given input data value, the selective inversion operation being defined, as one of an inversion operation and a non-inversion operation, by a bit value of a respective one of the trained one-bit weight values of the group of trained one-bit weight values associated with the given input data value. This represents the process described above with respect to FIGS. 6*a*-6*c*.

Returning to the method steps, at a step 810, the presence of any groups of trained one-bit weight values which all define a non-inversion operation (for example, weights values 11111 in the example five-bit one-hot system) is detected. Similarly, any groups of one-bit weight values which all define an inversion operation (for example 00000) are detected.

Then, at a step 820, BNN circuitry is generated which uses a respective intermediate result as a first predetermined result value for the given input data value which is independent of the given input data value; and, for a group of trained one-bit weight values which all define an inversion operation, which uses a respective intermediate result as a second predetermined result value for the given input data value which is independent of the given input data value.

Finally at a step 830, the circuitry is implemented, for example as a bespoke circuit such as a field programmable gate array (FPGA) or an application specific integrated circuit (ASIC).

The step 820 recognises a particular instance which can occur in a one-hot system when the weight bits represent "all inversion" or "all non-inversion".

Because only one bit of the one-hot value can be 1 (as an example of the first predetermined bit value) and the other bits are 0 (as an example of the second, complementary, predetermined bit value), a set of weights representing "all inversion" are bound to generate a contribution of +4 to the output 520 of the popcount adder tree. Similarly, a set of weights representing "all non-inversion" are bound to generate a contribution of +1 to the output 520 of the popcount adder tree. Given that the weights are learned during the training stage 700 and are not altered at the inference stage, the set of five (in this example) XNOR operations associated with the XNOR processing of an n-bit one-hot representation of a particular feature can be replaced entirely in the generated circuitry by circuitry which simply generates a value of +1 or +(n−1) for "all non-inversion" or "all inversion" respectively. Indeed, in these instances, it is not even necessary to provide (in the generated circuitry) any part of the encoding layer relating to the feature in question, as the output of the circuitry replacing the XNOR combinations is independent of the actual feature value.

Therefore, with reference to the step 820 as described above, the first predetermined result value is equal to the sum of the first predetermined bit value plus (n−1)×the second predetermined bit value; and the second predetermined result value is equal to the sum of the second predetermined bit value plus (n−1)×the first predetermined bit value.

Figure 9:
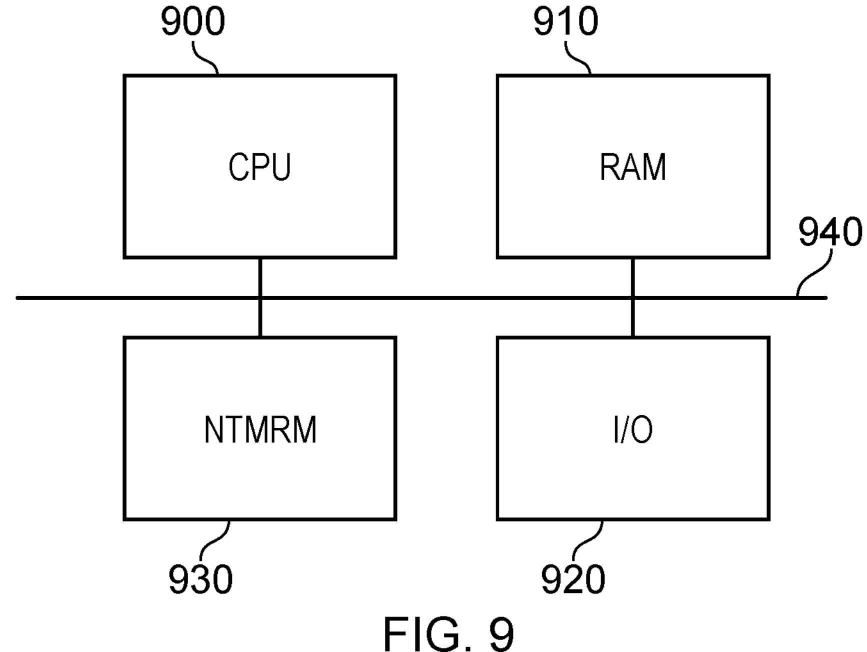
FIG. 9 schematically illustrates an example data processing apparatus.

As mentioned above, the method of FIG. 8 is computer-implemented, and FIG. 9 schematically illustrates a suitable computer processor to implement such a method, comprising a central processing unit or CPU 900, a random access memory or RAM 910, input/output (I/O) circuitry 920 and a non-transitory machine-readable medium 930 such as a flash memory, a magnetic or optical disc or the like which stores program instructions to implement the computer-implemented method. The various components of FIG. 9 are connected together by a bus arrangement 940.

Pruned BNN—First Example

Figures 10, 11:
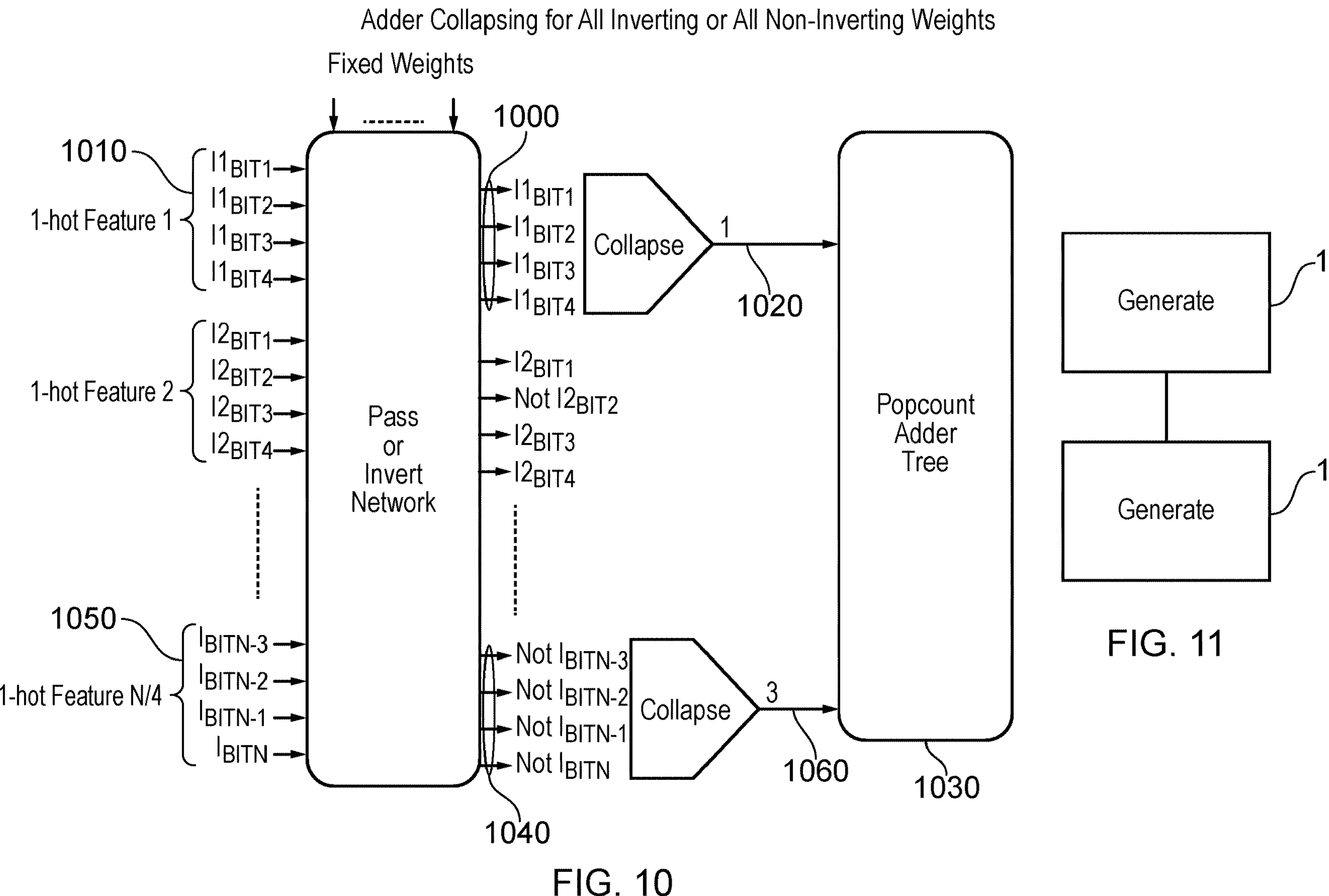
FIG. 10 schematically illustrates a part of a BNN circuit design.
FIG. 11 is a schematic flowchart illustrating a method.

FIG. 10 schematically illustrates a part of a BNN circuit design, using (for this example) four-bit one-hot encoded data values.

Here, groups of weight values which all cause an inversion or all cause a non-inversion are detected as discussed above. An example group 1000 of bits are all "not inverted". Given that the input data to that set of non-inversion is a one-hot data value 1010 which (in this example) has only one instance of a 1, the output 1020 supplied to the popcount adder tree 1030 must be the value of 1, as it represents a non-inversion of three 0s and one 1.

Similarly, in the case of a set of weight values which all represent an inversion, output bits 1040, each representing an inversion of the respective input bits of a one-hot data word 1050, must give rise to an input to the popcount adder tree 1030 of +3, given that they represent three instances of NOT (0) plus one instance of NOT (1).

In this way, all of the logic associated with the encoding of those feature values and the XNOR combination of input one-hot data word 1010 and the input one-hot data word 1050 can be removed from the circuitry as implemented and replaced by a simple circuit which always generates the output 1020 of 1 or the output 1060 of 3.

Further Example Generation Method

Another technique can be applied in addition to or separately from the above techniques. FIG. 11 is a schematic flowchart illustrating a method for use in an example case where the hidden layer comprises an activation function to generate the hidden layer output signal as a one-bit signal dependent upon a comparison of a sum of the intermediate results generated for all of the input data values with a threshold value.

Referring to FIG. 11, when the threshold value is greater than a maximum possible value of the sum of intermediate results, the method comprises generating (at a step 1100) circuitry which uses a first value of the hidden layer output signal independently of the trained one-bit weight values and the input data values; and when the threshold value is less than or equal to a minimum possible value of the sum of intermediate results, the method comprises generating (at a step 1110) circuitry which uses a second value of the hidden layer output signal independently of the trained one-bit weight values and the input data values.

Pruned BNN—Second Example

Figure 12:
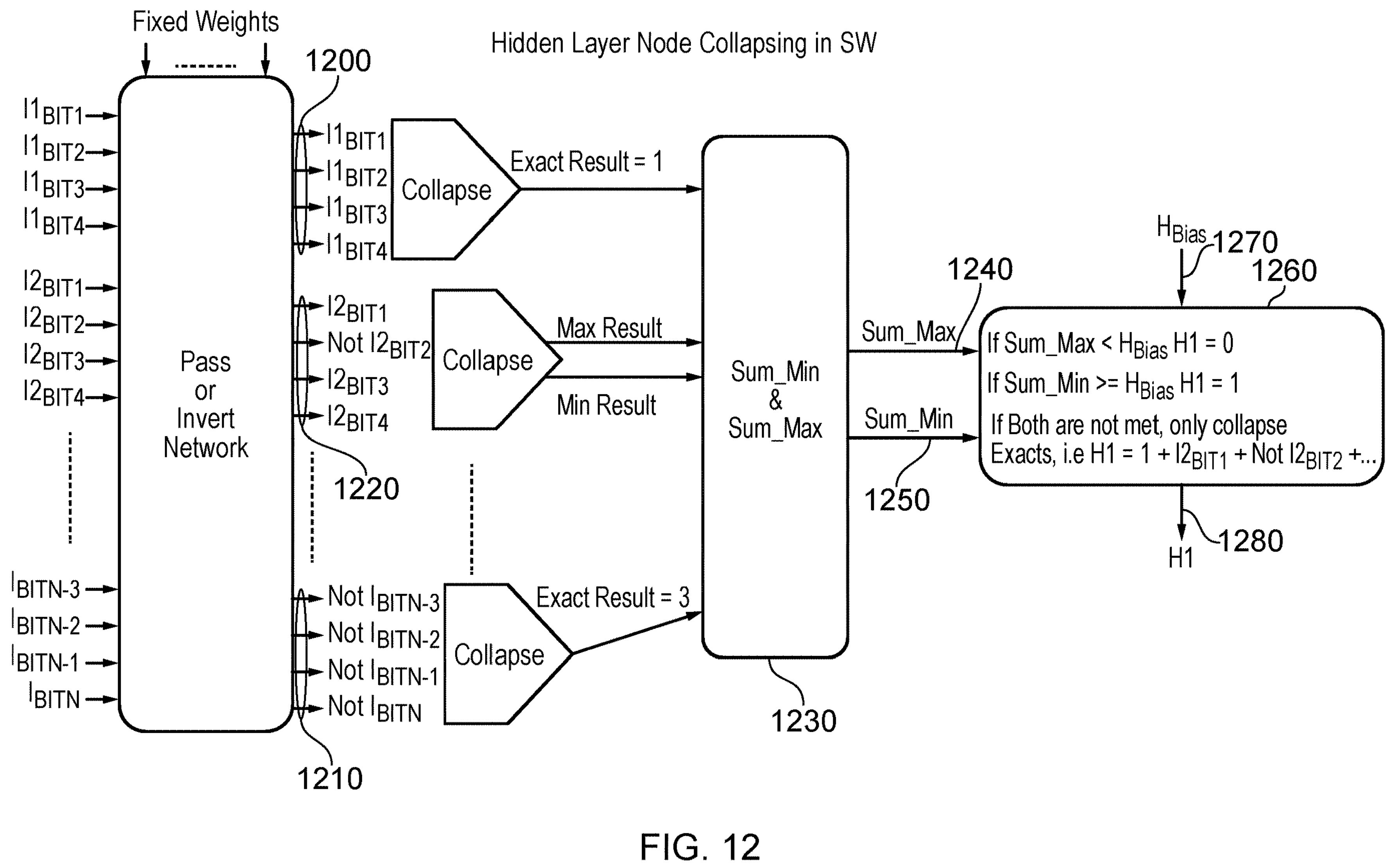
FIG. 12 schematically illustrates a part of a BNN circuit design.
Figure 13:
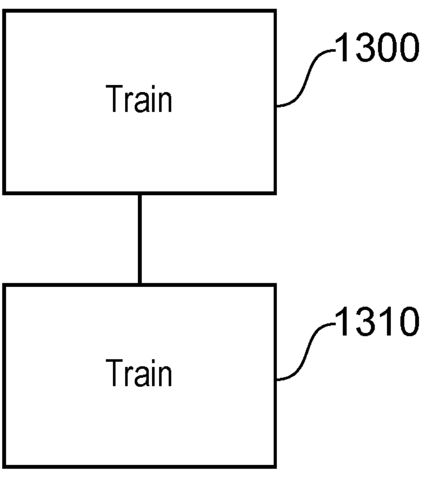
FIG. 13 is a schematic flowchart illustrating a method.

FIG. 12 schematically illustrates this process, in which groups 1200, 1210 of bits are handled in the same way as respective groups 1000, 1040 of FIG. 10.

In the case, however, of a group of bits 1220, the weight values, counting (for schematic purposes) from the top as drawn represent [non-invert, invert, non-invert, non-invert] or for example 1011.

During the stage 710, it is possible to detect from these a maximum outcome to be provided to the popcount adder circuitry 1230, and a minimum outcome, for an example 4-bit one-hot data value (and noting that the special cases of "all invert" and "all non-invert" are dealt with above as fixed outcomes) as follows:

(a) One "Invert" Weight:

Result=X1+(Not X2)+X3+X4 where X is a 4-bit one-hot encoded Value

If X2=0, Max Result=2 because only one of X1, X3 or X4 must be 1.

If X2=1, Min Result=0 because X1, X3 and X4 must be all 0.

(b) Two "Invert" Weights:

Result=(Not X1)+(Not X2)+X3+X4 where X is a 4-bit one-hot encoded Value

If X1=0 and X2=0, Max Result=3 because only one of X3 or X4 must be 1.

If (X1=0 and X2=1) or (X1=1 and X2=0), Min Result=1 because X1, X3 and X4 must be all 0.

(c) Three "Invert" Weights:

Result=(Not X1)+(Not X2)+(Not X3)+X4 where X is a 4-bit one-hot encoded Value

If X1=0 and X2=0 and X3=0, Max Result=4 because X4 must be 1.

If one of X1, X2 and X3 is 1, Min Result=2 because X1, X3 and X4 must be all 0.

Taking into account all of the other fixed or variable inputs to the popcount adder circuitry 1230, a maximum possible sum 1240 and a minimum possible sum 1250 can be derived.

The activation stage 1260 compares the output of the popcount adder circuitry with a threshold value $H_{bias}$ 1270 as described above in connection with the stage 545.

The maximum sum, Sum_Max 1240, is derived as (sum of fixed values for "all invert" and "all non-invert" weights)+(sum of "Max Results" for other features)

The minimum sum, Sum_Min 1250, is derived as (sum of fixed values for "all invert" and "all non-invert" weights)+(sum of "Min Results" for other features)

If the maximum sum 1240 is less than the bias value 1270, then the output 1280 of this stage will always be 0. This allows the entire circuitry of FIG. 12 to be collapsed or pruned down to a single line or logic gate providing a 0 output all of the time.

On the other hand, if the minimum sum 1250 is greater than or equal to the bias value 1270, then the output 1280 will always be one, again allowing the entire circuitry of FIG. 12 to be collapsed down to a single line providing a logic of one.

If neither condition is met, then just the groups of bits relating to exact results (those described with reference to FIG. 10) are collapsed, and the other groups such as the group 1220 are retained to be implemented as circuitry.

Learned Range Boundaries

Techniques will now be described by which the range boundaries for one-hot encoding in a BNN (described above as R0 . . . R5 or at least R1 . . . R4) can be learned. These techniques may be used in combination with or independently of the other techniques described above.

In the present examples, a computer-implemented method comprises:

training a binary neural network, BNN, the BNN being configured to apply a processing function defined by a set of one or more learned parameters to generate output data values in response to input data values, the BNN comprising an encoding layer to encode each input data value into a respective one-hot n-bit data value in which each of the n bits indicates whether the input data value lies in a respective sub-range defined by respective learned range boundaries, the training step comprising training (at a step 1300) at least the learned parameters and training (at a step 1310) the learned range boundaries.

Note that the two types of data which are trained in this way can be trained during a single training phase, using the techniques of FIG. 1, optionally modified as discussed below for the training of the range boundaries.

The goal of the input data encoding stage 320 is to map a feature value into bins or ranges defined by learned range boundaries. A bin corresponds to the bit position in the one-hot encoded form of the feature value.

For every real valued feature i, a maximum number of bits is available for encoding, $k_i$. The network will find an encoding for this feature up to this maximum number of bits. In practice, it may be that the learning method to be discussed below will not use more than the number of bits required to solve the problem if it can be solved adequately with fewer than $k_i$ bits.

Each feature is multiplied by its own set of $k_i$ distinct coefficients ($m_i$), and has an offset $b_i$ added to it. We gather these values in a vector $y_i$ for each feature. After this, a so-called softmax function is applied separately to each vector $y_i$. The softmax function is described in, for example, https://en.wikipedia.org/wiki/Softmax_function, the contents of which are incorporated into this description by reference. This function converts each vector into a probability of the feature belonging to a bin, whose boundaries are defined by the coefficients $m_i$ and $b_i$.

The next step is optional. Each $y_i$ is replaced by a sample from a Concrete distribution with $y_i$ as the parameter. This is a means of injecting noise which can assist the training process. The Concrete distribution is described in, for example, Maddison et al "The Concrete Distribution: a continuous relaxation of discrete random variables", ICLR 2017, the contents of which are incorporated into this description by reference.

Following this, the $y_i$ vector is translated into a one-hot encoding form by adding a constant vector to each $y_i$. The constant vector is defined by the maximum probability in the $y_i$ vector. For example, if $y_i$=[0.3, 0.5, 0.2] the constant vector becomes [−0.3, 0.5, −0.2] and give out the one-hot encoded vector form as $y_i$=[0, 1, 0]. That this offset is treated as a constant is significant, as the values of $m_i$ and $b_i$ are learned using the so-called gradient descent technique using that assumption. Following this, all the one-hot encoded vectors are concatenated to form one vector whose length is the sum of $k_i$ for each i.

During training, features may be represented as being either in {−1, +1}, or {0, 1}, the former being more commonly used when using binary neural networks. This step can be performed after concatenation but is not necessary.

The encoding produced by this layer is fed into further layers in a neural network, which is then trained using a backpropagation/gradient descent technique. The learned parameters of this layer are $m_i$ and $b_i$, for each feature I, for a total of $2*k_i$ parameters per feature.

Once the training is complete, a feature value is divided into intervals, and the algorithm maps each interval of a feature value into a respective bin. One way to compute which intervals belong to which bin is to sweep over the values of a feature $x_i$ from a predetermined minimum to maximum value and compute $y_i$ at each step. The index of $y_i$, which is maximal at a particular feature value, is the bin to which that feature value belongs. The points at which the maximum changes are the boundaries of the bins.

Figure 14:
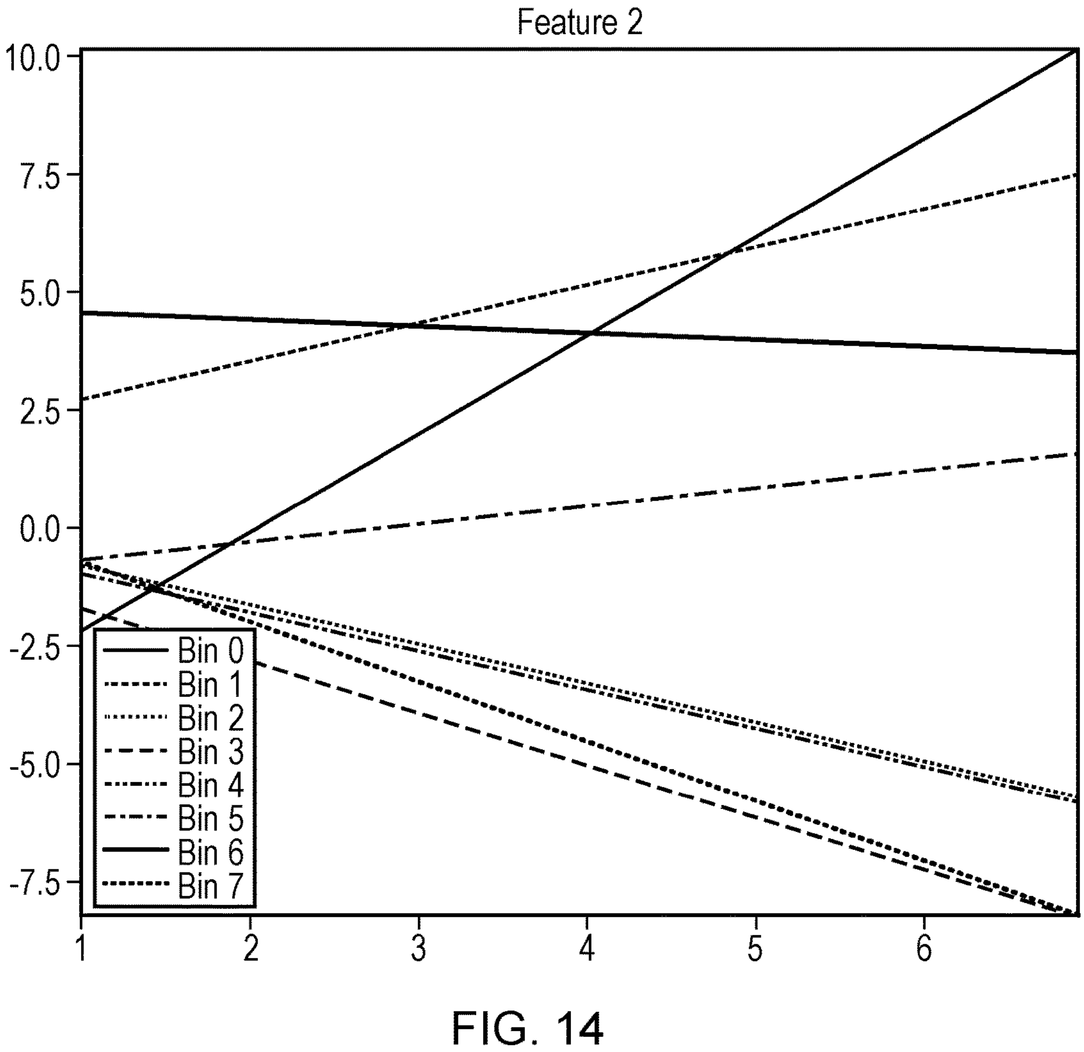
FIG. 14 schematically illustrates an example of a derivation of learned range boundaries.

Although sweeping across the feature values to find bin centres is done offline after training and is not a computationally expensive procedure, an algorithm may be used which identifies them using geometry. In this example, $y_i$ is a vector, with elements $y_{1i}$ to $y_{ni}$, similarly $m_{1i}$ to $m_{ni}$, and so on for $b_i$, are used. For every feature this gives $k_i$ equations of lines given by $y_{ji}=m_{ji}x_i+b_{ji}$. If all of these lines are plotted as a graph, for valid feature values, at any point, the appropriate bin is given by the line which is the highest. An example for a real model trained on synthetic data is given as FIG. 14 for an eight-bin system.

A procedure to find the bin boundaries is to find which line is maximal at the left edge (minimum feature value), and then to find the next line which intersects this line at a point further to the right. Repeat this procedure finds each intersection until the right-hand side is reached (maximum feature value).

A simple algorithm (represented below in pseudocode) is provided to find the change points and the corresponding bin boundaries for a feature $y_i$. For ease of notation, we will drop that indices referring to different features and focus on a single one. From now on, y[i] refers to the component 'i' of the $y_i$, vector for some j.

```
Require min_value, max_value for the feature
potential_bins = [0, ..., k]
bin_edges, bin_indices = [ ], [ ]
current_value = min_value
while True:
next_bin = index of minimum element of y[i] where i is in potential_bins
remove next_bin from potential_bins
current_w, current_b = w[next_bin], b[next_bin]
insert current_value into bin_edges
insert next_bin into bin_indices
intersections = hash( )
for index in potential_bins:
   intersection = (current_b − b[index]) / (w[index] − current_w)
   if intersection is valid and intersection > current_value:
      intersections[index] = intersection
   if intersections is empty:
      break
   else:
      current_value = minimum of intersections
insert max_value into bin_edges
expect bin_edges to contain n edges, the first being min_value, the last
max_value
expect bin_indices to contain n − 1 indices indicating which bin the
region is assigned to
```

This algorithm generates the bin boundaries and bin locations that are passed to the inference stage, meaning that all we need to store in the inference stage are these boundary conditions and bins to which new feature values will map.

The use of learned bin boundaries in combination with the other techniques discussed above can lead to an efficient (for example, low gate number) circuitry implementation of a BNN.

Example Use Case

Figure 15:
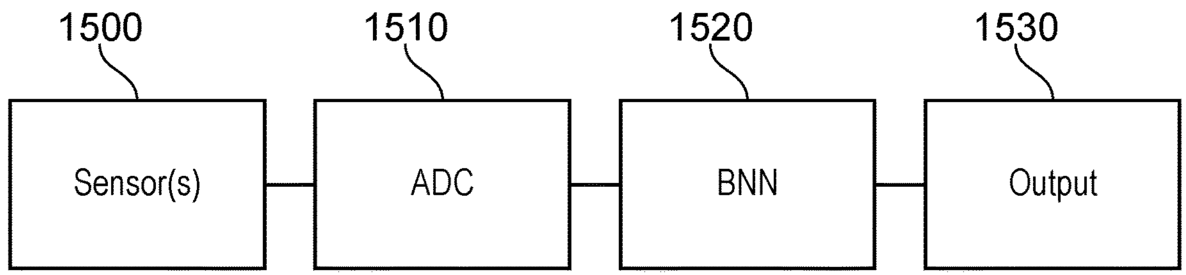
FIG. 15 schematically illustrates an apparatus.

FIG. 15 is a schematic diagram of apparatus or circuitry showing an indicative use case of the generated and fabricated BNN circuitry 1520, in which one or more sensors 1500 generate sensor data such as biometric (health) data, temperature data or the like. An analogue-to-digital conversion stage 1510 (assuming that analogue sensors are used) converts the sensor data to feature data in a digital format for encoding by the encoding layer of the BNN circuitry 1520. The BNN circuitry output is provided to output circuitry 1530, for example a liquid crystal display output or the like, indicative of a categorised output based on the sensor data.

Example implementations could be formed of low-cost, low-gate-count programmable circuitry and may even be implemented in physically flexible single use circuitry for example for use in medical plasters or bandages or in food labels.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A data processing apparatus comprising:

binary neural network, BNN, circuitry to implement a BNN;

the BNN circuitry comprising at least one instance of hidden layer circuitry responsive to trained one-bit weight values and input data values to generate a hidden layer output signal;

in which:

each input data value comprises a one-hot n-bit data value, where n is an integer greater than one, in which, for any input data value, only one bit of the given input data value has a first predetermined bit value and all other bits of that input data value have a second predetermined bit value complementary to the first predetermined bit value, the trained one-bit weight values comprise groups of n trained one-bit weight values, each group being associated with a respective input data value;

the hidden layer circuitry is configured to generate the hidden layer output signal dependent upon an intermediate result of a selective inversion operation applied to each bit of a given input data value, the selective inversion operation being defined, as one of an inversion operation and a non-inversion operation, by a bit value of a respective one of the trained one-bit weight values of the group of trained one-bit weight values associated with the given input data value;

the hidden layer circuitry comprises, for a group of trained one-bit weight values which all define a non-inversion operation, circuitry to generate a respective intermediate result as a first predetermined result value for the given input data value which is independent of the given input data value; and, for a group of trained one-bit weight values which all define an inversion operation, circuitry to generate a respective intermediate result as a second predetermined result value for the given input data value which is independent of the given input data value.

2. The apparatus according to claim 1, in which the first predetermined bit value is 1 and the second predetermined bit value is 0.

3. The apparatus according to claim 1, in which each trained one-bit weight value defines an inversion operation by that trained one-bit weight value being 0, and a non-inversion operation by that trained one-bit weight value being 1.

4. The apparatus according to claim 1, in which:

the first predetermined result value is equal to the sum of the first predetermined bit value plus (n−1) times the second predetermined bit value; and the second predetermined result value is equal to the sum of the second predetermined bit value plus (n−1) times the first predetermined bit value.

5. The apparatus according to claim 1, in which the hidden layer circuitry comprises activation function circuitry to generate the hidden layer output signal as a one-bit signal dependent upon a comparison of a sum of the intermediate results generated for all of the input data values with a threshold value.

6. A computer-implemented method comprising:

generating binary neural network, BNN, circuitry to implement a BNN;

the BNN comprising at least one instance of a hidden layer responsive to trained one-bit weight values and input data values to generate a hidden layer output signal;

in which:

each input data value comprises a one-hot n-bit data value, where n is an integer greater than one, in which, for any input data value, only one bit of the given input data value has a first predetermined bit value and all other bits of that input data value have a second predetermined bit value complementary to the first predetermined bit value, the trained one-bit weight values comprise groups of n trained one-bit weight values, each group being associated with a respective input data value;

the hidden layer is configured to generate the hidden layer output signal dependent upon an intermediate result of a selective inversion operation applied to each bit of a given input data value, the selective inversion operation being defined, as one of an inversion operation and a non-inversion operation, by a bit value of a respective one of the trained one-bit weight values of the group of trained one-bit weight values associated with the given input data value;

the method comprising:

for a group of trained one-bit weight values which all define a non-inversion operation, generating BNN circuitry which uses a respective intermediate result as a first predetermined result value for the given input data value which is independent of the given input data value; and, for a group of trained one-bit weight values which all define an inversion operation, generating BNN circuitry which uses a respective intermediate result as a second predetermined result value for the given input data value which is independent of the given input data value.

7. A method according to claim 6, in which the first predetermined bit value is 1 and the second predetermined bit value is 0.

8. A method according to claim 6, in which each trained one-bit weight value defines an inversion operation by that trained one-bit weight value being 0, and a non-inversion operation by that trained one-bit weight value being 1.

9. A method according to claim 6, in which the first predetermined result value is equal to the sum of the first predetermined bit value plus (n−1) times the second predetermined bit value; and the second predetermined result value is equal to the sum of the second predetermined bit value plus (n−1) times the first predetermined bit value.

10. A method according to claim 6, in which the hidden layer comprises an activation function to generate the hidden layer output signal as a one-bit signal dependent upon a comparison of a sum of the intermediate results generated for all of the input data values with a threshold value.

11. A method according to claim 10, in which, when the threshold value is greater than a maximum possible value of the sum of intermediate results, the method comprises generating circuitry which uses a first value of the hidden layer output signal independently of the trained one-bit weight values and the input data values; and when the threshold value is less than or equal to a minimum possible value of the sum of intermediate results, the method comprises generating circuitry which uses a second value of the hidden layer output signal independently of the trained one-bit weight values and the input data values.

12. A computer-implemented method comprising:

training a binary neural network, BNN, the BNN being configured to apply a processing function defined by a set of one or more learned parameters to generate output data values in response to input data values, the BNN comprising an encoding layer to encode each input data value into a respective one-hot n-bit data value, where n is an integer greater than one, in which, for any one-hot n-bit data value, only one bit has a first predetermined bit value and all other bits of that one-hot n-bit data value have a second predetermined bit value complementary to the first predetermined bit value, in which each of the n bits indicates whether the input data value lies in a respective sub-range defined by respective learned range boundaries, the training step comprising training at least the learned parameters and the learned range boundaries.

13. A method according to claim 12, in which the training step comprises, for each of a plurality of instances of input data values in a set of training data during an iterative training phase of the BNN:

deriving the one-hot n-bit data value using a current set of the range boundaries;

applying the processing function in dependence upon a current set of the learned parameters to generate a test output data value;

comparing the test output data value with a corresponding output data value of the training data; and generating one or more modifications to the learned range boundaries and the learned parameters in response to the comparing step.

14. A method according to claim 13, in which the deriving step comprises:

the encoding layer allocating respective sub-ranges of possible values of the input data value to each bit position in the one-hot n-bit data values.

15. A method according to claim 14, in which for a given input data value, generating a set of n test values each representing a respective probability that the input data value falls into a respective test sub-range defined by one or more learned range boundaries;

adding a set of n offset values to respective ones of the test values;

generating the input data value by assigning a first predetermined bit value to a bit position in dependence upon sum of the test values and the offset values;

processing the input data value using the BNN;

deriving an error value; and updating the one or more learned range boundaries in dependence upon a gradient of an error value with respect to the one or more learned range boundaries.

16. A method according to claim 15, in which the one or more learned range boundaries include a multiplicative parameter m and an additive parameter b for each respective bit position.

17. A method according to claim 16, comprising multiplying the sample data value by m and adding b to the product of the sample data value and m.

18. A method according to claim 15, in which the step of generating the test values comprises applying a softmax function.

19. A method according to claim 15, comprising deriving a set of sub-ranges for use in an inference phase in dependence upon the one or more learned parameters.

* * * * *